(12) United States Patent
Yoho et al.

(10) Patent No.: US 10,532,761 B2
(45) Date of Patent: Jan. 14, 2020

(54) SPINDLE AND STEERING COLUMN ASSEMBLY HAVING SAME

(71) Applicants: THYSSENKRUPP PRESTA AG, Eschen (LI); THYSSENKRUPP AG, Essen (DE)

(72) Inventors: Justin Yoho, Whitestown, IN (US); Thomas Geiselberger, Carmel, IN (US); Christian Pichonnat, Indianapolis, IN (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 155 days.

(21) Appl. No.: 15/833,585

(22) Filed: Dec. 6, 2017

(65) Prior Publication Data

US 2019/0168796 A1 Jun. 6, 2019

(51) Int. Cl.
*B62D 1/16* (2006.01)
*B23P 11/02* (2006.01)
*B62D 1/18* (2006.01)

(52) U.S. Cl.
CPC .............. *B62D 1/16* (2013.01); *B23P 11/02* (2013.01); *B62D 1/18* (2013.01); *B23P 2700/50* (2013.01)

(58) Field of Classification Search
CPC .................................. B62D 1/18; B62D 1/16
See application file for complete search history.

(56) References Cited

U.S. PATENT DOCUMENTS 1,555,214 A * 9/1925 Johnson ................... B62D 1/16
                                                         384/297
5,368,330 A * 11/1994 Arnold ................... B62D 1/192
                                                         280/775

(Continued)

FOREIGN PATENT DOCUMENTS

DE          3536285 C1 *  4/1987  ............. B62D 1/181
DE   102009021499 A1 * 11/2009  ............. B62D 1/16

(Continued)

OTHER PUBLICATIONS

PCT Appln. No. PCT/EP2018/083361, International Search Report and Written Opinion, dated Mar. 29, 2019, 25 pages.

*Primary Examiner* — Nicole T Verley
(74) *Attorney, Agent, or Firm* — Lathrop Gage LLP

(57) ABSTRACT

One steering column assembly includes a jacket, a bearing, and a steering spindle rotatably supported by the bearing and at least partially extending inside the jacket. The spindle includes a hollow outer tube and a hollow inner tube. The outer tube has lengthening and attachment sections, and the attachment section has transition and connection portions. The lengthening section adjoins the attachment section at an end of the transition portion, and the transition portion is between the lengthening section and the connection portion. The lengthening section has first and second portions, with the second portion being between the first and transition portions, and the outer tube terminates at an end of the connection portion. The inner tube is press-fit into the outer tube, and an end of the inner tube is adjacent the transition portion end. The inner tube does not extend into either the attachment section or the first portion.

7 Claims, 2 Drawing Sheets

(56) References Cited

U.S. PATENT DOCUMENTS

| | | | | |
|---|---|---|---|---|
| 5,590,565 A * | 1/1997 | Palfenier | B62D 1/181 | 74/493 |
| 5,722,300 A * | 3/1998 | Burkhard | B62D 1/185 | 280/775 |
| 6,623,036 B2 * | 9/2003 | Yamamura | B62D 1/184 | 280/775 |
| 6,733,039 B2 * | 5/2004 | Honda | B62D 1/16 | 267/141.2 |
| 7,267,370 B2 | 9/2007 | Drinan | | |
| 7,275,767 B2 * | 10/2007 | Appleyard | B62D 1/192 | 280/777 |
| 7,490,855 B2 * | 2/2009 | Inayoshi | B62D 1/192 | 280/777 |
| 7,497,470 B2 * | 3/2009 | Streng | B62D 1/192 | 188/371 |
| 7,506,893 B2 * | 3/2009 | Higashino | B62D 1/192 | 280/776 |
| 7,779,945 B2 * | 8/2010 | Allgauer | B21D 41/045 | 180/78 |
| 8,127,639 B2 | 3/2012 | Manwaring et al. | | |
| 8,408,089 B2 * | 4/2013 | Oshita | B62D 1/195 | 280/775 |
| 8,627,742 B2 * | 1/2014 | Ridgway | B62D 1/192 | 280/777 |
| 8,910,365 B2 | 12/2014 | Walser | | |
| 9,085,320 B2 * | 7/2015 | Appleyard | B62D 1/184 | |
| 9,260,130 B2 * | 2/2016 | Mizuno | B62D 1/187 | |
| 9,637,158 B2 * | 5/2017 | Kingston-Jones | B62D 1/185 | |
| 10,000,229 B2 * | 6/2018 | Matsuno | B62D 1/189 | |
| 10,040,472 B2 * | 8/2018 | Sulser | B62D 1/16 | |
| 10,378,577 B2 * | 8/2019 | Wilkes | F16C 29/04 | |
| 2004/0020249 A1 * | 2/2004 | Battermann | B21D 39/04 | 70/186 |
| 2004/0177715 A1 * | 9/2004 | Kittler | B21D 39/04 | 74/492 |
| 2007/0151392 A1 * | 7/2007 | Oshita | B62D 1/192 | 74/493 |
| 2007/0245845 A1 * | 10/2007 | Ridgway | B62D 1/189 | 74/493 |
| 2012/0324965 A1 * | 12/2012 | Yamamoto | B62D 1/16 | 70/183 |
| 2016/0123376 A1 | 5/2016 | Buschbeck | | |
| 2017/0096159 A1 * | 4/2017 | Sulser | B62D 1/16 | |
| 2019/0054948 A1 * | 2/2019 | Ancelin | B62D 1/185 | |
| 2019/0168281 A1 * | 6/2019 | Krimmel | B21D 39/04 | |

FOREIGN PATENT DOCUMENTS

| | | | | |
|---|---|---|---|---|
| DE | 102016214163 A1 | 10/2016 | | |
| EP | 0477509 A2 * | 4/1992 | | B62D 1/181 |
| EP | 1693279 A1 * | 8/2006 | | B62D 1/181 |
| GB | 2070984 A * | 9/1981 | | B62D 1/192 |
| JP | 2001151123 A | 6/2001 | | |
| JP | 5369537 B2 * | 12/2013 | | |
| WO | WO-2007098513 A1 * | 9/2007 | | B21D 41/045 |

* cited by examiner

SPINDLE AND STEERING COLUMN ASSEMBLY HAVING SAME

FIELD OF THE DISCLOSURE

The disclosure relates generally to the field of steering column assemblies for motor vehicles. More specifically, the disclosure relates to spindles for steering column assemblies.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a steering spindle includes a hollow outer tube and a hollow inner tube. The hollow outer tube has a lengthening section and an attachment section, and the attachment section has a transition portion and a connection portion. The lengthening section adjoins the attachment section at an end of the transition portion, and the transition portion is between the lengthening section and the connection portion. An outer diameter of the connection portion is smaller than an outer diameter of the lengthening section. The lengthening section has first and second portions, with the second portion being between the first portion and the transition portion, and the outer tube terminates at an end of the connection portion. The hollow inner tube is press-fit into the outer tube, and an end of the inner tube is adjacent the end of the transition portion. The inner tube does not extend into either the attachment section or the first portion, and a length of the second portion is at least equal to a length of the inner tube.

In an embodiment, a length of the second portion is greater than a length of the attachment section. The length of the second portion may be at least three times a length of the attachment section.

In an embodiment, an inner diameter of the inner tube is larger than an inner diameter of the connection portion.

In an embodiment, the outer tube is constructed of metal and the inner tube is constructed of metal.

In an embodiment, the natural frequency of the connection portion is at least 55 Hz in a vertical direction and at least 57 Hz in a lateral direction.

In an embodiment, the natural frequency of the connection portion is at least 69 Hz in a vertical direction and at least 71 Hz in a lateral direction.

According to another embodiment, a steering column assembly includes a jacket, a bearing, and a steering spindle rotatably supported by the bearing and at least partially extending inside the jacket. The steering spindle includes a hollow outer tube and a hollow inner tube. The hollow outer tube has a lengthening section and an attachment section, and the attachment section has a transition portion and a connection portion. The lengthening section adjoins the attachment section at an end of the transition portion, and the transition portion is between the lengthening section and the connection portion. An outer diameter of the connection portion is smaller than an outer diameter of the lengthening section. The lengthening section has first and second portions, with the second portion being between the first portion and the transition portion, and the outer tube terminates at an end of the connection portion. The hollow inner tube is press-fit into the outer tube, and an end of the inner tube is adjacent the end of the transition portion. The inner tube does not extend into either the attachment section or the first portion, and a length of the second portion is at least equal to a length of the inner tube.

In an embodiment, at least part of the second portion is cantilevered from the bearing, and a distance between the bearing and the end of the connection portion is at least 70 mm.

In an embodiment, the natural frequency of the connection portion is at least 55 Hz in a vertical direction and at least 57 Hz in a lateral direction.

In an embodiment, the natural frequency of the connection portion is at least 69 Hz in a vertical direction and at least 71 Hz in a lateral direction.

In an embodiment, a length of the second portion is greater than a length of the attachment section, and an inner diameter of the inner tube is larger than an inner diameter of the connection portion.

In an embodiment, the outer tube is constructed of metal and the inner tube is constructed of metal.

According to still another embodiment, a method of creating a steering spindle includes the steps of providing a hollow outer tube and a hollow inner tube. The outer tube has a uniform inner diameter and a longitudinal axis, and the outer tube terminates at an end, with an attachment section of the outer tube extending from the end of the outer tube. The inner tube has a uniform outer diameter and a longitudinal axis, and the outer diameter of the inner tube is larger than the inner diameter of the outer tube. The inner tube is press-fit entirely into the outer tube with the longitudinal axis of the inner tube being coaxial with the longitudinal axis of the outer tube. The inner tube is press-fit such that the attachment section is free of the inner tube, and such that an end of the inner tube is adjacent the attachment section. After the inner tube is positioned, transition and connection portions are formed—but only in the attachment section.

In an embodiment, the natural frequency of the connection portion is at least 55 Hz in a vertical direction and at least 57 Hz in a lateral direction.

In an embodiment, the natural frequency of the connection portion after the inner tube is press fit into the outer tube is at least 69 Hz in a vertical direction and at least 71 Hz in a lateral direction.

In an embodiment, a length of the second portion is greater than a length of the attachment section.

In an embodiment, the step of press-fitting comprises press-fitting the inner tube into the outer tube through the outer tube end and the attachment section.

In an embodiment, the step of forming comprises hammer-forming.

DETAILED DESCRIPTION

The natural frequency and stiffness of an automobile's steering column, and in particular an automobile's steering spindle, have a substantial effect on driver satisfaction. Higher natural frequencies and stiffness aid in minimizing shake and the transmission of vibrations, and significantly contribute to a pleasurable driving experience. Natural frequency and stiffness has traditionally be increased through material selection or by increasing the thickness of the spindle's cross section. Yet non-traditional materials may be expensive or have other limitations, increasing cross-section thickness may undesirably increase weight or cost, and designs for modern steering column assemblies require increasingly longer spindles.

Figure 1:
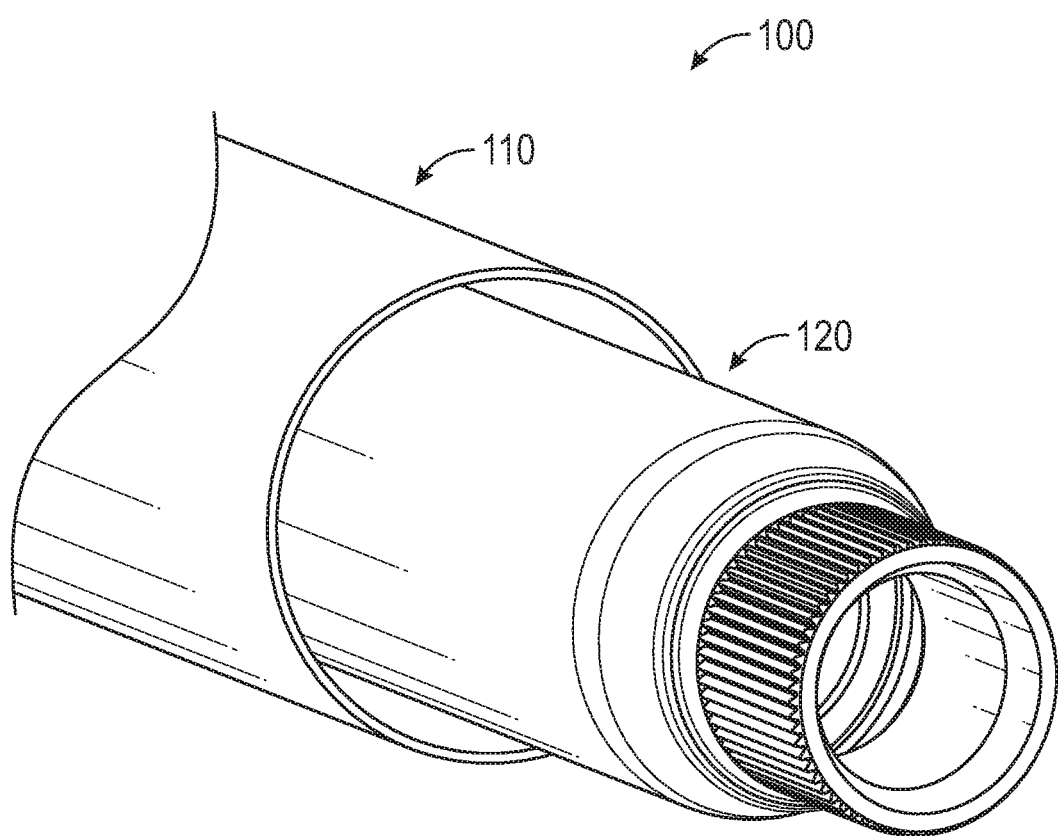
FIG. 1 is a perspective view of part of a steering column assembly, according to an embodiment of the present disclosure.
Figure 2:
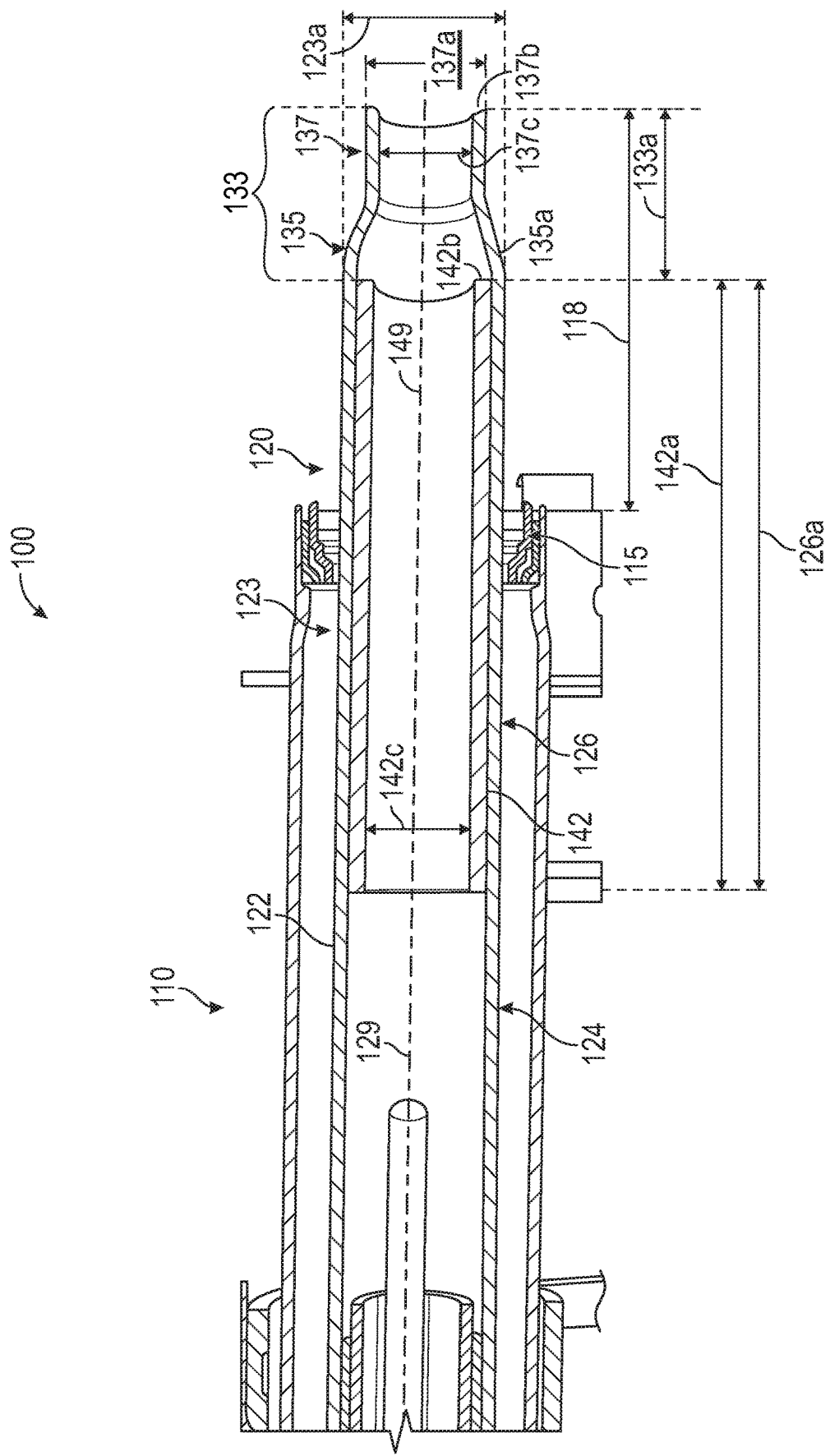
FIG. 2 is a section view taken from FIG. 1.

FIGS. 1 and 2 illustrate a steering column assembly 100 according to one embodiment. The steering column assembly 100 broadly includes a jacket 110 and a bearing 115 rotatably supporting a steering shaft (or "spindle") 120 such that the spindle 120 at least partially extends inside the jacket 110.

The spindle 120 has hollow outer tube 122 and a hollow inner tube 142 press-fit into the outer tube 122. While the outer and inner tubes 122, 142 may be constructed of any appropriate materials, it may be particularly desirable for the tubes 122, 142 to be constructed of metal (including metal alloys). The outer tube 122 has a lengthening section 123 and an attachment section 133, and the attachment section 133 in turn has a transition portion 135 and a connection portion 137.

The lengthening section 123 adjoins the attachment section 133 at an end 135a of the transition portion 135, and the transition portion 135 is between the lengthening section 123 and the connection portion 137. The outer tube 122 terminates at an end 137b of the connection portion 137, and the connection portion 137 has an outer diameter 137a that is smaller than an outer diameter 123a of the lengthening section 123.

The lengthening section 123 has first and second portions 124, 126, and the second portion 126 is between the first portion 124 and the transition portion 135. A length 126a of the second portion 126 is at least equal to (i.e., is not less than) a length 142a of the inner tube 142, and the length 126a of the second portion 126 is greater than a length 133a of the attachment section 133. In some embodiments, it may be particularly desirable for the length 126a of the second portion 126 to be at least three times the length 133a of the attachment section 133. At least part of the second portion 126 is cantilevered from the bearing 115, and in some embodiments it may be particularly desirable for a distance 118 between the bearing 115 and the end 137b of the connection portion 137 to be at least 70 mm and for the natural frequency of the connection portion 137 to be at least 55 Hz in a vertical direction and at least 57 Hz in a lateral direction. In some embodiments, it may be desirable for the natural frequency of the connection portion 137 to be at least 69 Hz in a vertical direction and at least 71 Hz in a lateral direction.

The inner tube 142 does not extend into either the attachment section 133 or the first portion 124, and an end 142b of the inner tube 142 is adjacent the end 135a of the transition portion 135. An inner diameter 142c of the inner tube 142 is larger than an inner diameter 137c of the connection portion 137.

To create the steering spindle 120, the hollow outer tube 122 initially has generally uniform inner and outer diameters and terminates at the end 137b (from which the attachment section 133 extends). And the hollow inner tube 142 initially has generally uniform inner and outer diameters, with the outer diameter of the inner tube being larger than the inner diameter of the outer tube. The inner tube 142 is press-fit entirely into the outer tube 122 with a longitudinal axis 149 of the inner tube 142 being coaxial with a longitudinal axis 129 of the outer tube 122. The inner tube 142 is sufficiently press-fit into the outer tube 122 such that the attachment section 133 is free of the inner tube 142 and the end 142b of the inner tube 142 is adjacent the attachment section 133. It may be particularly desirable for the inner tube 142 to be press-fit into the outer tube 122 by being inserted through the end 137b and the attachment section 133. Once the inner tube 142 is appropriately located, the transition portion 135 and the connection portion 137 are formed only in the attachment section 133. The transition portion 135 and the connection portion 137 may be hammer-formed or created in any other appropriate manner, whether now existing or later developed. It may be particularly desirable in some embodiments for the natural frequency of the connection portion 137 after the inner tube 142 is press-fit into the outer tube 122 and the transition and connection portions 135, 137 are formed to be at least 55 Hz in a vertical direction and at least 57 Hz in a lateral direction. It may be particularly desirable in other embodiments for the natural frequency of the connection portion 137 after the inner tube 142 is press-fit into the outer tube 122 and the transition and connection portions 135, 137 are formed to be at least 69 Hz in a vertical direction and at least 71 Hz in a lateral direction.

The outer tube 122 may be coupled with an inner shaft for torque transmitting, which is connectable with an input shaft of a steering gear, and a universal joint may be arranged between the inner shaft and the input shaft of the steering gear. In an embodiment, the outer tube 122 and the inner shaft are telescopic to each other.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A steering spindle, comprising:
   a hollow outer tube having a lengthening section and an attachment section, the attachment section having a transition portion and a connection portion, the lengthening section adjoining the attachment section at an end of the transition portion, the transition portion being between the lengthening section and the connection portion, an outer diameter of the connection portion being smaller than an outer diameter of the lengthening section, the lengthening section having first and second portions, the second portion being between the first portion and the transition portion, the outer tube terminating at an end of the connection portion; and
   a hollow inner tube press-fit into the outer tube, an end of the inner tube being adjacent the end of the transition portion, the inner tube not extending into the attachment section, the inner tube not extending into the first portion, a length of the second portion being at least equal to a length of the inner tube.

2. The steering spindle of claim 1, wherein a length of the second portion is greater than a length of the attachment section.

3. The steering spindle of claim 2, wherein a length of the second portion is at least three times a length of the attachment section.

4. The steering spindle of claim 1, wherein an inner diameter of the inner tube is larger than an inner diameter of the connection portion.

5. The steering spindle of claim 1, wherein the outer tube is constructed of metal and the inner tube is constructed of metal.

6. The steering spindle of claim 1, wherein the natural frequency of the connection portion is at least 55 Hz in a vertical direction and at least 57 Hz in a lateral direction.

7. The steering spindle of claim 1, wherein the natural frequency of the connection portion is at least 69 Hz in a vertical direction and at least 71 Hz in a lateral direction.

* * * * *